US011470961B2

(12) United States Patent
Henry, Jr. et al.

(10) Patent No.: US 11,470,961 B2
(45) Date of Patent: Oct. 18, 2022

(54) VEHICLE SHELF SYSTEM AND METHOD OF USE

(71) Applicant: Adrian Steel Company, Adrian, MI (US)

(72) Inventors: Mark Anthoney Henry, Jr., Adrian, MI (US); Joshua Merle Rogers, Manitou Beach, MI (US); Joshua Michael Gerez, Tecumseh, MI (US)

(73) Assignee: Adrian Steel Company, Adrian, MI (US)

( * ) Notice: Subject to any disclaimer, the term of this patent is extended or adjusted under 35 U.S.C. 154(b) by 242 days.

(21) Appl. No.: 17/036,495

(22) Filed: Sep. 29, 2020

(65) Prior Publication Data

US 2022/0097614 A1    Mar. 31, 2022

(51) Int. Cl.
*A47B 43/00* (2006.01)
*A47B 96/02* (2006.01)

(52) U.S. Cl.
CPC ............ *A47B 43/00* (2013.01); *A47B 96/025* (2013.01); *A47B 96/028* (2013.01)

(58) Field of Classification Search
CPC ...... A47B 43/00; A47B 96/025; A47B 96/028
See application file for complete search history.

(56) References Cited

U.S. PATENT DOCUMENTS

| | | |
|---|---|---|
| 1,228,042 A | 5/1917 | O'Dowd |
| 2,809,849 A | 4/1955 | Benne |
| 4,159,122 A | 6/1979 | Stevens |
| 5,308,158 A | 5/1994 | Vogelgesang et al. |
| 5,452,972 A | 9/1995 | Adams |
| 5,720,535 A | 2/1998 | Mehman |
| 5,848,660 A | 12/1998 | McGreen |
| 6,196,141 B1 | 3/2001 | Herron, III et al. |
| 6,962,116 B2 | 11/2005 | Bienick et al. |
| 7,401,709 B2 | 7/2008 | Stingel, Jr. et al. |
| 7,757,615 B2 | 7/2010 | McDonald, II et al. |
| 7,845,290 B2 | 12/2010 | Piretti |
| 7,963,383 B2 | 6/2011 | Stingel, III et al. |
| 8,181,583 B2 | 5/2012 | Rivera, Jr. et al. |
| 8,205,298 B2 | 6/2012 | Lin et al. |
| 8,234,752 B2 | 8/2012 | Anderson |
| 8,267,017 B1 | 9/2012 | Michael et al. |
| 8,561,550 B2 | 10/2013 | Raml |
| 8,651,293 B2 | 2/2014 | Boyer |

(Continued)

OTHER PUBLICATIONS

Canadian Intellectual Property Office, Examiner's Report in Application No. 3,097,735, dated Apr. 28, 2022, 6 pages, Quebec, Canada.

*Primary Examiner* — Matthew W Ing
(74) *Attorney, Agent, or Firm* — Marshall & Melhorn, LLC

(57) ABSTRACT

A shelf system may have a shelf member, and a biasing bracket attached to the shelf member having a rear portion and a forward portion. The system may also have a biasing member having a first end connected to the rear portion of the biasing bracket and a second end connected to the shelf member. The forward portion of the biasing bracket may have a lower stop adapted to prevent the shelf member from extending below a horizontal orientation. And, a pivot bracket may be located behind the lower stop through which a pivot extends and into the biasing bracket to permit selective movement of the shelf member.

19 Claims, 11 Drawing Sheets

(56) References Cited

U.S. PATENT DOCUMENTS

| | | |
|---|---|---|
| 8,839,559 B2 | 9/2014 | Neff |
| 8,857,347 B1 | 10/2014 | Liu et al. |
| 9,004,427 B2 | 4/2015 | Irudayaraj et al. |
| 9,260,046 B2 | 2/2016 | Mowry et al. |
| 9,357,839 B1 | 6/2016 | Liu et al. |
| 9,452,865 B2 | 9/2016 | Joshi et al. |
| 9,540,856 B2 | 1/2017 | Lin |
| 9,625,160 B2 | 4/2017 | Xiao |
| 9,770,102 B2 | 9/2017 | Conod |
| 9,801,465 B1 | 10/2017 | Finch, Jr. |
| 9,820,564 B2 | 11/2017 | Mullins |
| 9,878,649 B2 | 1/2018 | Beere |
| 9,897,250 B1 | 2/2018 | Sivertsen |
| 10,000,950 B2 | 6/2018 | Sandler |
| 10,035,465 B2 | 7/2018 | Waddell |
| 10,149,535 B2 | 12/2018 | O'Keefe et al. |
| 10,258,152 B1 | 4/2019 | Lentine et al. |
| 10,358,170 B2 | 7/2019 | Khatri et al. |
| 10,362,862 B2 | 7/2019 | Symalla |
| 10,384,581 B2 | 8/2019 | Preisler et al. |
| 10,589,652 B2 | 3/2020 | Preisler et al. |
| 10,709,235 B1 | 7/2020 | Brown et al. |
| 11,208,048 B2 * | 12/2021 | Herriman ................ A47B 96/14 |
| 2001/0035114 A1 * | 11/2001 | Ash .......................... A47B 5/02 |
| | | 108/147 |
| 2005/0211140 A1 * | 9/2005 | McDonald, II ........ A47B 57/20 |
| | | 108/108 |
| 2013/0167325 A1 * | 7/2013 | Hackenberg .............. E05F 1/12 |
| | | 16/302 |
| 2019/0133316 A1 * | 5/2019 | Lentine .................. A47B 96/07 |
| 2019/0254422 A1 * | 8/2019 | Beere ..................... A47B 96/07 |
| 2021/0112974 A1 * | 4/2021 | Appelo .................. A47B 43/00 |
| 2021/0153645 A1 * | 5/2021 | Beere ..................... B60N 3/002 |

\* cited by examiner

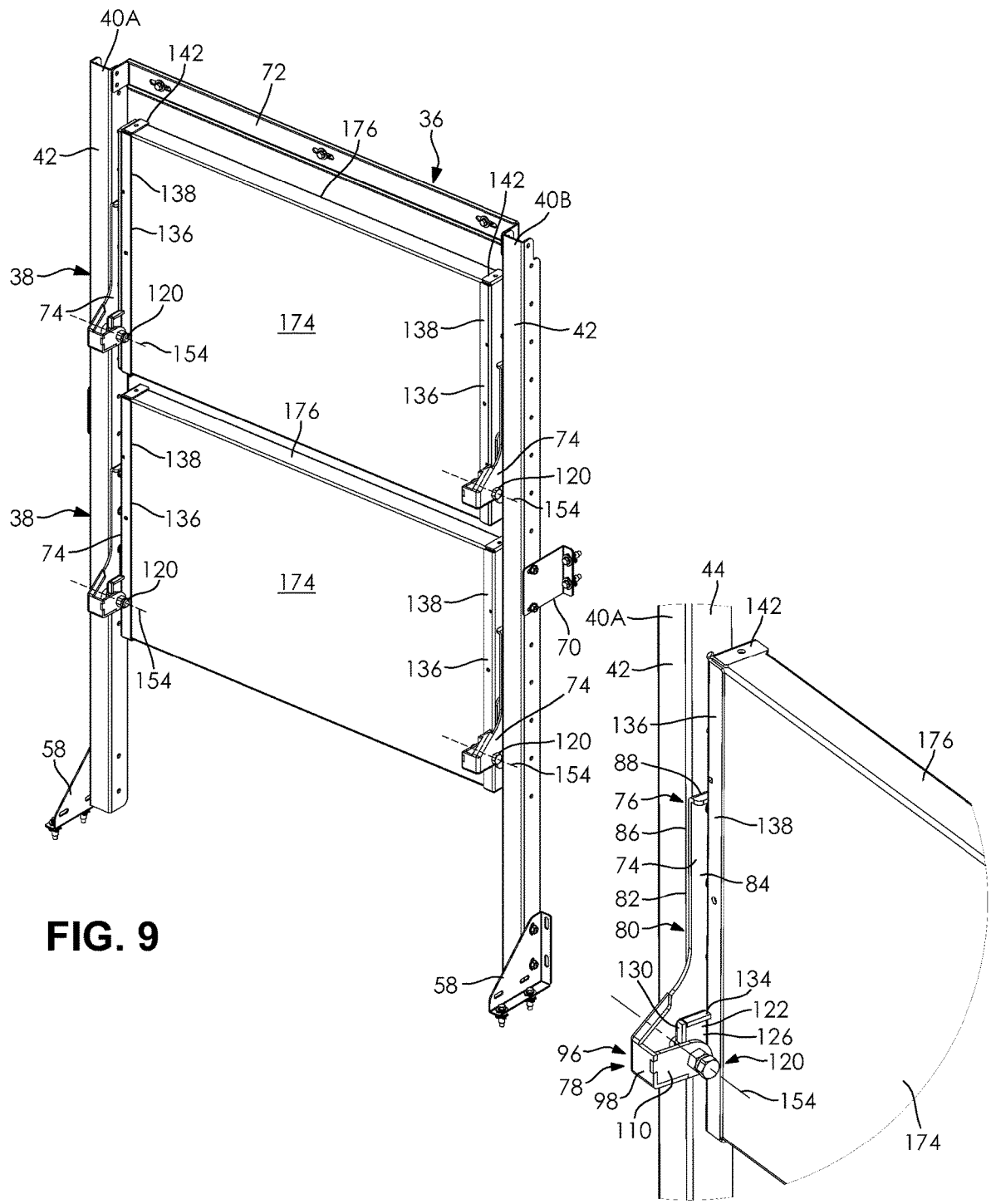

VEHICLE SHELF SYSTEM AND METHOD OF USE

FIELD

One embodiment of a shelf, adapted to a vehicle, and a method of use, are disclosed. The shelf may be located in an interior of a vehicle and pivot from a lowered position to a raised position to save space in the vehicle when not in use.

BACKGROUND

Utility/cargo vehicles often have interior spaces that may have a wide variety of structures to store and secure cargo therein, such as shelving. The disadvantage with some shelves is that they often have a fixed position within the vehicle and they cannot be stowed when they are not in use. These prior art shelves take up valuable space when they are not needed.

Some shelves can be stowed when not in use. These shelves, however, have complicated designs, which causes them to be expensive to manufacture. The manufacturing cost is passed on to consumers which makes the shelves expensive. The complicated designs also result in additional failure modes.

It would be advantageous for a vehicle shelf to be simple, yet robust, easily manufacturable and low cost, and be easily positioned within the vehicle and readily adjustable between a stowed position and a use position.

SUMMARY

In one embodiment, a shelf system may have a shelf member, and a biasing bracket attached to the shelf member having a rear portion and a forward portion. The biasing member may have a first end connected to the rear portion of the biasing bracket and a second end connected to the shelf member. The forward portion of the biasing bracket may have a lower stop adapted to prevent the shelf member from extending below a horizontal orientation. A pivot bracket may be located behind the lower stop. A pivot may extend through the pivot bracket and into the biasing bracket to permit selective movement of the shelf member.

In another embodiment, the biasing bracket may be attached to at least one upright member and the rear portion of the biasing bracket may extend behind the upright member and the forward portion of the biasing bracket may extend in front of the upright member.

In another embodiment, the first end of the biasing member may be pivotally connected to a stop bar that extends perpendicularly from the biasing bracket.

In another embodiment, the second end of the biasing member may be connected to a rear third portion of the shelf member with a ball stud.

In another embodiment, the biasing bracket may have an upper front portion that is linear and coplanar with a front surface of the at least one upright member and the biasing bracket may have an angled, upper rear portion that extends behind a rear surface of the at least one upright member.

In another embodiment, the biasing bracket may have a lower front portion that extends in front of the front surface of the at least one upright member and the biasing bracket may have a lower rear portion that is coplanar with a side surface of the at least one upright member.

In another embodiment, the lower front portion of the biasing bracket may have a side portion that extends parallel a portion of the upright member, and a front portion that extends perpendicular to the side portion.

In another embodiment, a lock member may be keyed to the front portion, and the lock member may extend parallel the side portion.

In another embodiment, an axis of the biasing member may be offset and not parallel with an axis of the upright member.

In another embodiment, a second end of the biasing member may be connected to the shelf member at a point rearward and above a pivot axis for the shelf member.

In yet another embodiment, a shelf system may have at least one upright member with a biasing bracket attached thereto. The biasing bracket may have a forward portion that extends in front of the at least one upright member and a rear portion that extends behind the at least one upright member. The system may also have a shelf member with at least one side bracket. The system may also have a biasing member having a first end and a second end. The first end may be attached to the rear portion of the biasing member bracket and the second end may be attached to the at least one side bracket. The at least one side bracket may be adapted to selectively rotate over a pivot point created by a pivot bracket under the at least one side bracket. The biasing bracket and a lock member may extend parallel the biasing bracket.

In another embodiment, the pivot point may be offset forward from the upright member.

In another embodiment, the first end of the biasing member may pivot in location and the second end of the biasing member may define a pivot arc between a shelf member raised position and a shelf member lowered position.

In another embodiment, the pivot arc may be located above the pivot point.

In another embodiment, the second end of the biasing member may extend forward of the pivot point in a shelf member lowered position.

In another embodiment, the second end of the biasing member is aligned with the at least one upright member in a shelf member raised position.

In another embodiment, the at least one side bracket has a forward portion and a rear portion with a body portion connecting the forward portion and the rear portion. The pivot bracket may extend below the body portion. A supplemental plate with a complementary shape to at least a portion of the body portion and the pivot bracket may extend parallel the body portion and the pivot bracket.

BRIEF DESCRIPTION OF THE DRAWINGS

The above, as well as other advantages, will become readily apparent to those skilled in the art from the following detailed description when considered in the light of the accompanying drawings in which:

FIG. 9 depicts a front perspective view of one embodiment of a shelf system with the shelves in a raised orientation;

FIG. 10 depicts a detail from FIG. 9;

DETAILED DESCRIPTION OF THE PREFERRED EMBODIMENTS

It is to be understood that the device and method may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figure 1:
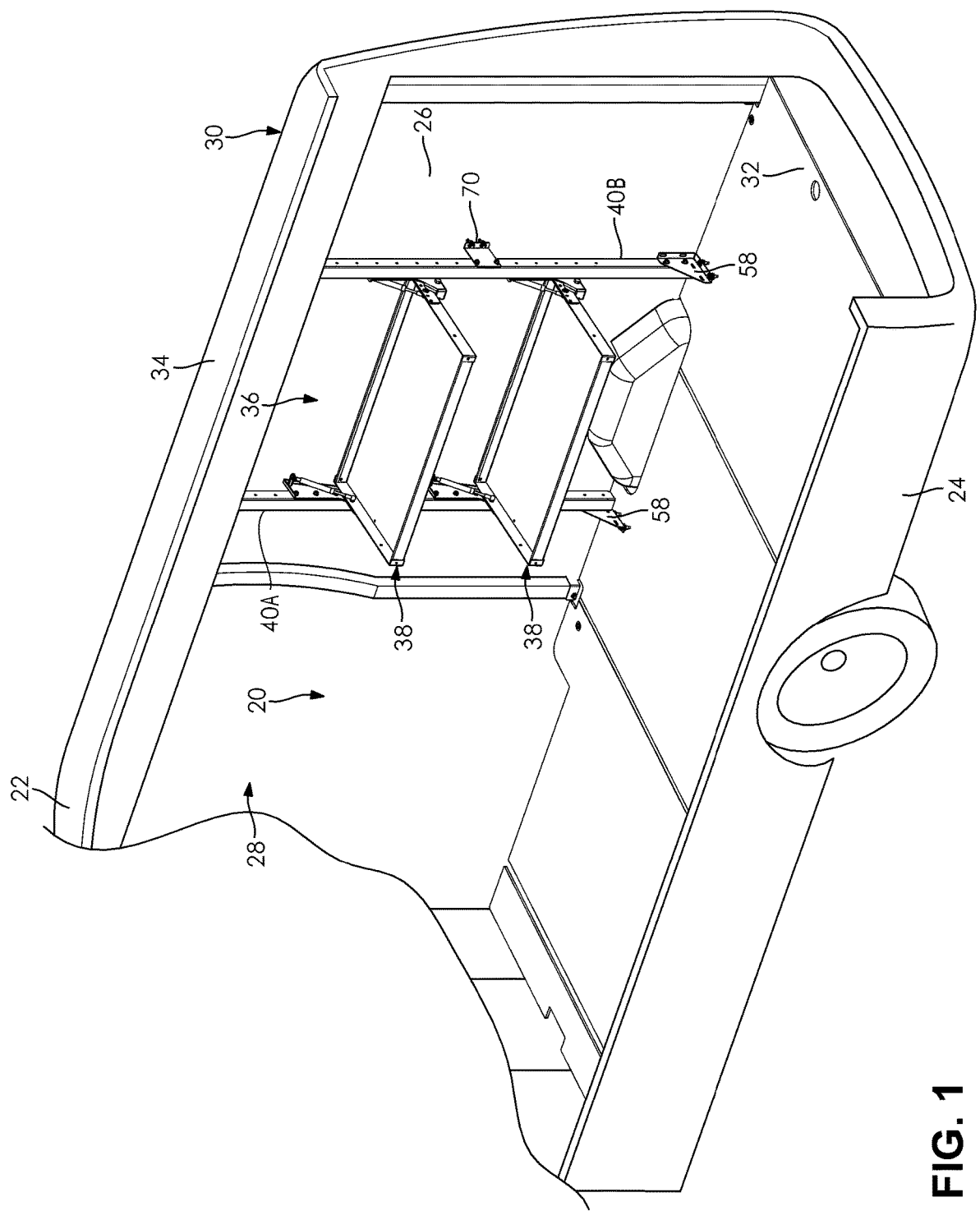
FIG. 1 depicts a rear perspective, schematic view of a partial cut away showing one embodiment of a passenger's side of an interior of a vehicle.
Figure 2:
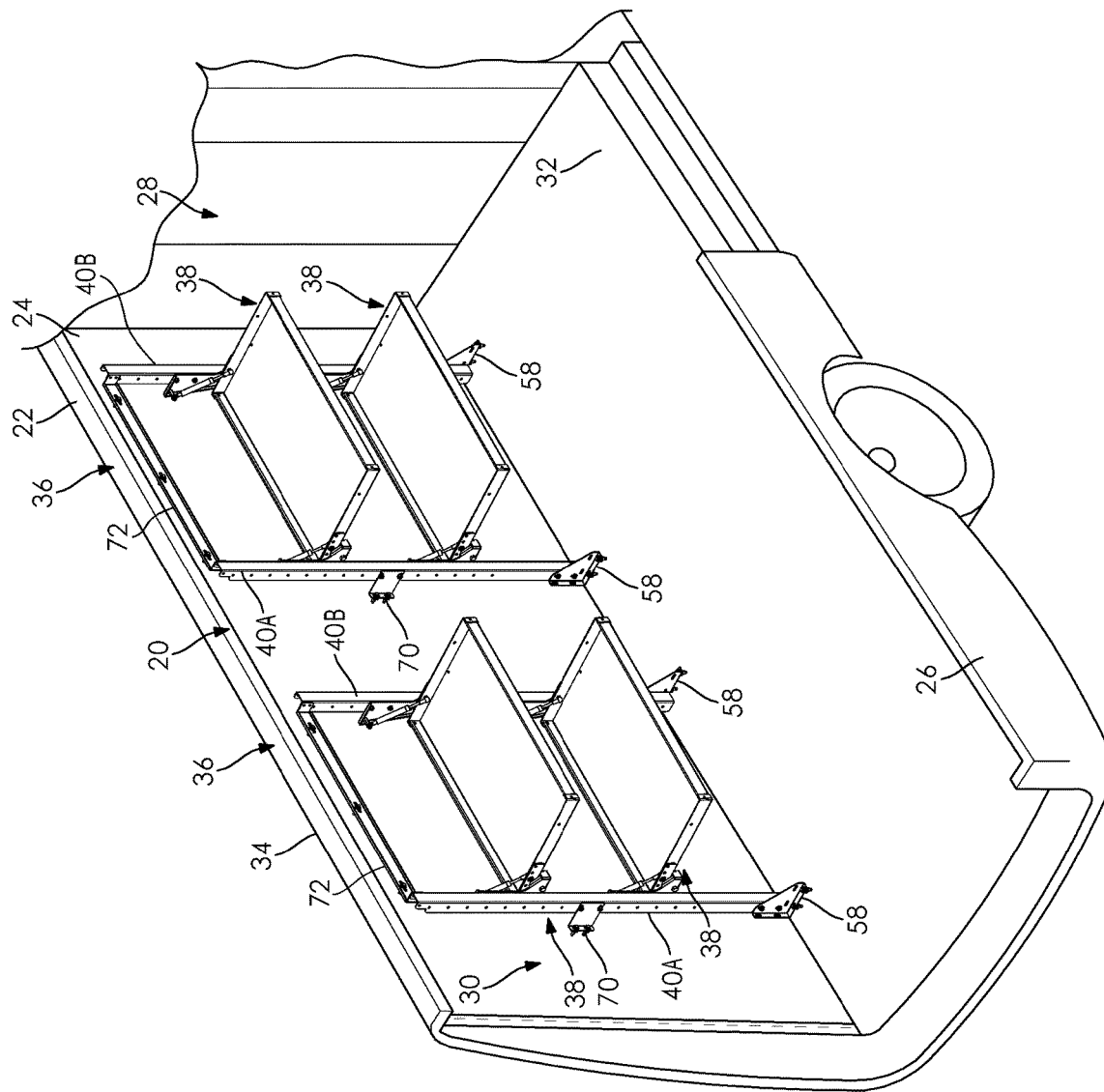
FIG. 2 depicts a rear perspective, schematic view of a partial cut away showing one embodiment of a driver's side of an interior of a vehicle.
Figure 3:
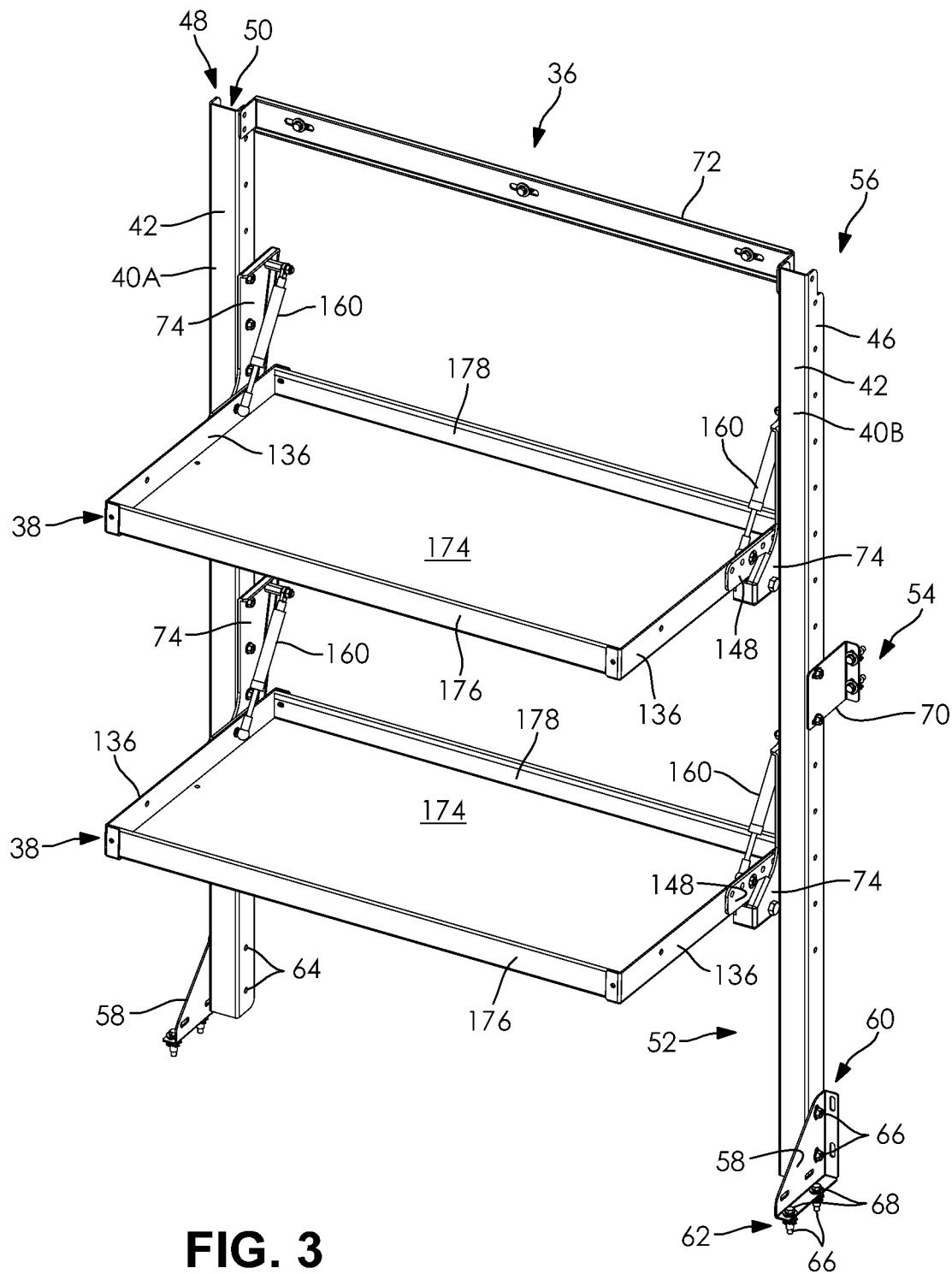
FIG. 3 depicts a front perspective view of one embodiment of a shelf system with shelves in a lowered orientation.

Turning to FIGS. 1 and 2, one embodiment of a partial cargo area 20 for a vehicle 22 is schematically depicted. The vehicle 22 may be such as a cargo van, but other vehicles with other cargo areas of various shapes and sizes may be used.

The cargo area 20 is typically defined by at least two side walls 24, 26, a forward portion 28 and a rear portion 30. The forward portion 28 may be adjacent a driver's compartment (not shown). The driver's compartment may be separated from the cargo area 20 by the driver and passenger seats or a partition may separate the cargo area 20 from the driver's compartment. The rear portion 30 may be defined by doors or a wall (not shown).

The side walls 24, 26 extend from a floor 32 to a ceiling 34 of the vehicle 22. In some cases, the side walls 24, 26 are comprised of a plurality of panels and/or pillars. The panels and pillars add strength and shape to the side walls 24, 26.

The side walls 24, 26 may be generally parallel one another, but they may or may not be the same length as one another. Instead, as shown in the depicted embodiment, the side wall 24 on the driver's side of the vehicle 22 is longer than the side wall 26 on the passenger's side of the vehicle 22. In this case, the side wall 26 on the passenger's side may accommodate a sliding or hinged door(s).

A vehicle shelf system 36 described and depicted herein is designed to work with the existing panels and pillars of the side walls 24, 26 without any modification to their size, shape, location or structural integrity. Three vehicle shelf systems 36 are depicted in FIGS. 1 and 2. One system 36 is depicted on one side wall 26, while two systems 36 are depicted on the opposite side wall 24. These numbers and orientations are merely exemplary as any number of systems 36 can be located on any of the side walls 24, 36. FIGS. 1 and 2, as well as some of the figures that follow, depict each system 36 with two shelf members 38. The system 36 is not limited to two shelf members 38 and any number (e.g. one or more) can be included with a particular system 36, even in the same vehicle 22.

In many of the figures, the system 36 is depicted as having at least one upright member 40A, 40B. The upright member 40A, 40B may be such as a single piece of stamped metal, but it may also be comprised of multiple pieces that are connected together. The upright member 40A, 40B may have a central flange 42 bounded by side flanges. The side flanges may be the same as one another or different. The side flanges may be comprised of an inner side flange 44 and an outer side flange 46.

Figure 8:
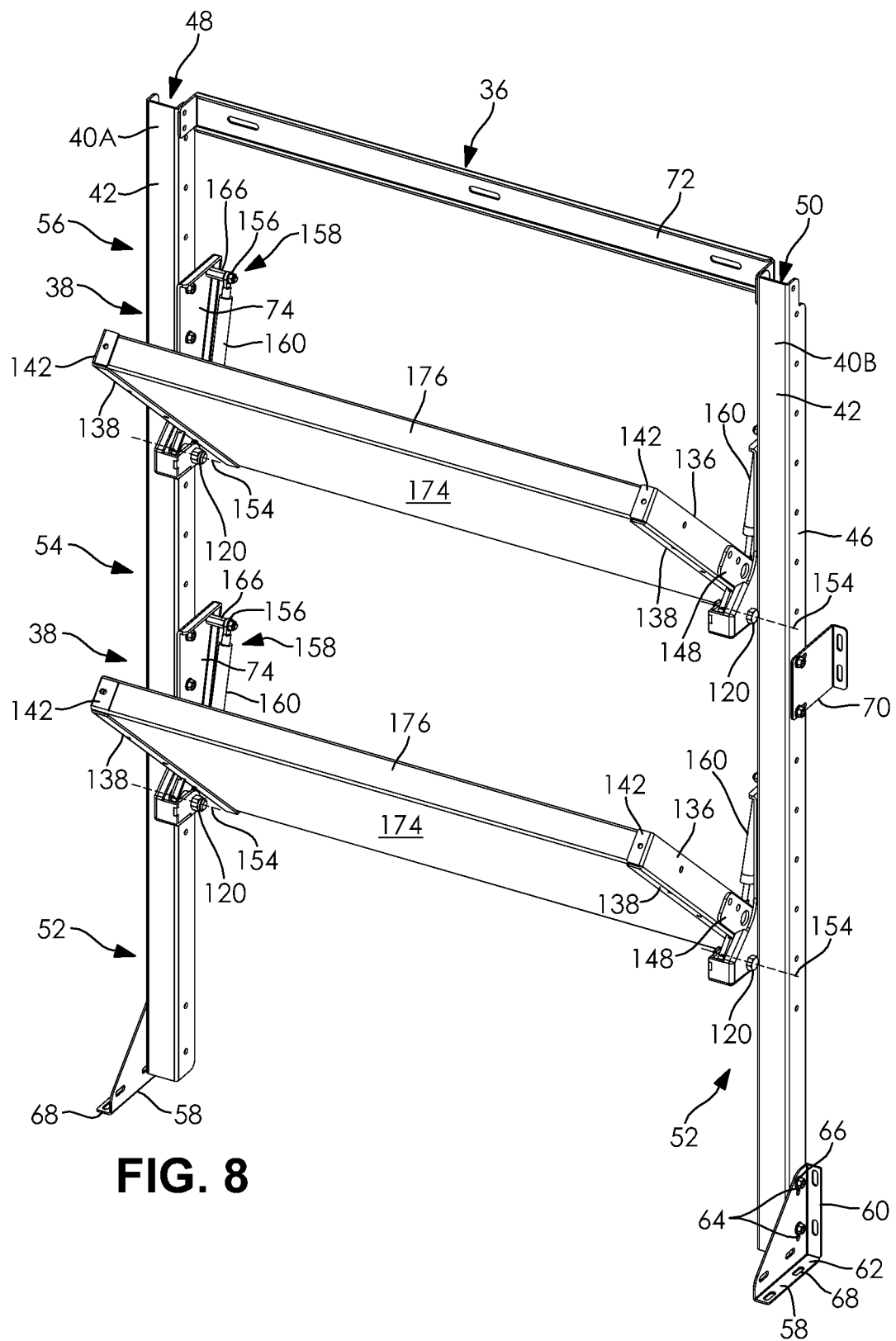
FIG. 8 depicts a front perspective view of one embodiment of a shelf system with the shelves between a lowered and a raised orientation.

The central flange 42 and the side flanges 44, 46 may extend the length of the upright member 40A, 40B. The side flanges 44, 46 may be coplanar with one another but the central flange 40A, 40B may not be coplanar with the side flanges 44, 46. In one embodiment, a backside 48 of the upright member 40A, 40B, shown in FIGS. 8 and 9, may define a void space 50 created by the central flange 42 being offset from the side flanges 44, 46 and the side flanges 44, 46 being spaced apart from one another. In the same embodiment, the central flange 42 may be at least as wide as the individual side flanges 44, 46.

The upright member 40A 40B may extend the vertical length of a sidewall 24, 26 or just a portion thereof. The upright members 40A, 40B shown in the figures extend most, if not all, of the length of the sidewalls 24, 26. In any case, the upright members 40A, 40B have a lower portion 52, a central body portion 54 and an upper portion 56. The upright member 40A, 40B may be connected to the vehicle side wall 24, 26, floor 32 and/or ceiling 34. For example, the upright member 40A, 40B may be connected, or provided, with a floor bracket 58 as shown in FIGS. 3-5, 9 and 11. The floor bracket 58 may have an upright member portion 60 and a floor portion 62. The upright member portion 60 may have apertures 64 aligned with apertures (not shown) in the upright member 40A, 40B through which mechanical fasteners 66 may be fitted to secure them together. For example, the upright member portion 60 of the floor bracket 58 may be connected to the lower portion 52 of an outer side flange 46 of the upright member 40A, 40B.

Similarly, the floor portion 62 of the floor bracket 58 may have apertures 68 aligned with apertures (not shown) in the floor 32 through which mechanical fasteners 66 may be fitted to secure them together. These features can be appreciated in at least FIGS. 3-5, 9 and 11.

An upright member 40A, 40B may also be provided with a central body flange 70 in the central body portion 54 of the upright member 40A, 40B. The central body flange 70 may be connected to a side flange of the upright member 40A, 40B, such as the outer side flange 46. Further, the central body flange 70 may be connected to a side wall 24, 26 of the vehicle 22. The connections for the central body flange 70 to the upright member 40A, 40B and to the side wall 24, 26 may be through mechanical fasteners 66.

One embodiment of the these feature may be seen in FIGS. 3-5, 9 and 11.

In some embodiments, first and second upright members 40A, 40B are provided. The upright members 40A, 40B may be located a constant distance away from one another on a vehicle side wall 24, 26. The first and second upright members 40A, 40B may be located anywhere along the side wall 24, 26, and there may be more than one pair of upright members 40A, 40B on any one side wall 24, 26.

As shown in FIGS. 3-4, 9 and 11, header bar 72 may be located between the first and second upright members 40A, 40B. In one embodiment, the header bar 72 is located between the upper portions 56 of the two upright members 40A, 40B. The header bar 72 may connected with the first and second upright members 40A, 40B such as with mechanical fasteners 66 that extend through the inner side flanges 44 of the upright members 40A, 40B and into the header bar 72. Mechanical fasteners 66 may also be located through the header bar 72 into the side wall 24, 26 of the vehicle 22 to secure them together. The header bar 72 may maintain the first and second upright members 40A, 40B a fixed distance from one another, and add rigidity and strength to the shelf system 36.

The system 36 may also have at least one biasing mounting bracket 74. The biasing mounting bracket 74 may have an upper portion 76 and a lower portion 78 where a body portion 80 connects the upper and lower portions 76, 78. The upper portion 76 and the body portion 80 may be generally triangularly shaped. The biasing mounting bracket 74 may be seen in FIGS. 3-10 and 12-17.

The at least one biasing mounting bracket 74 may have first and second sides 82, 84 that may be substantially parallel to one another. The first and second sides 82, 84 define a substantially constant thickness between them, which might be best appreciated in FIG. 4.

Figure 4:
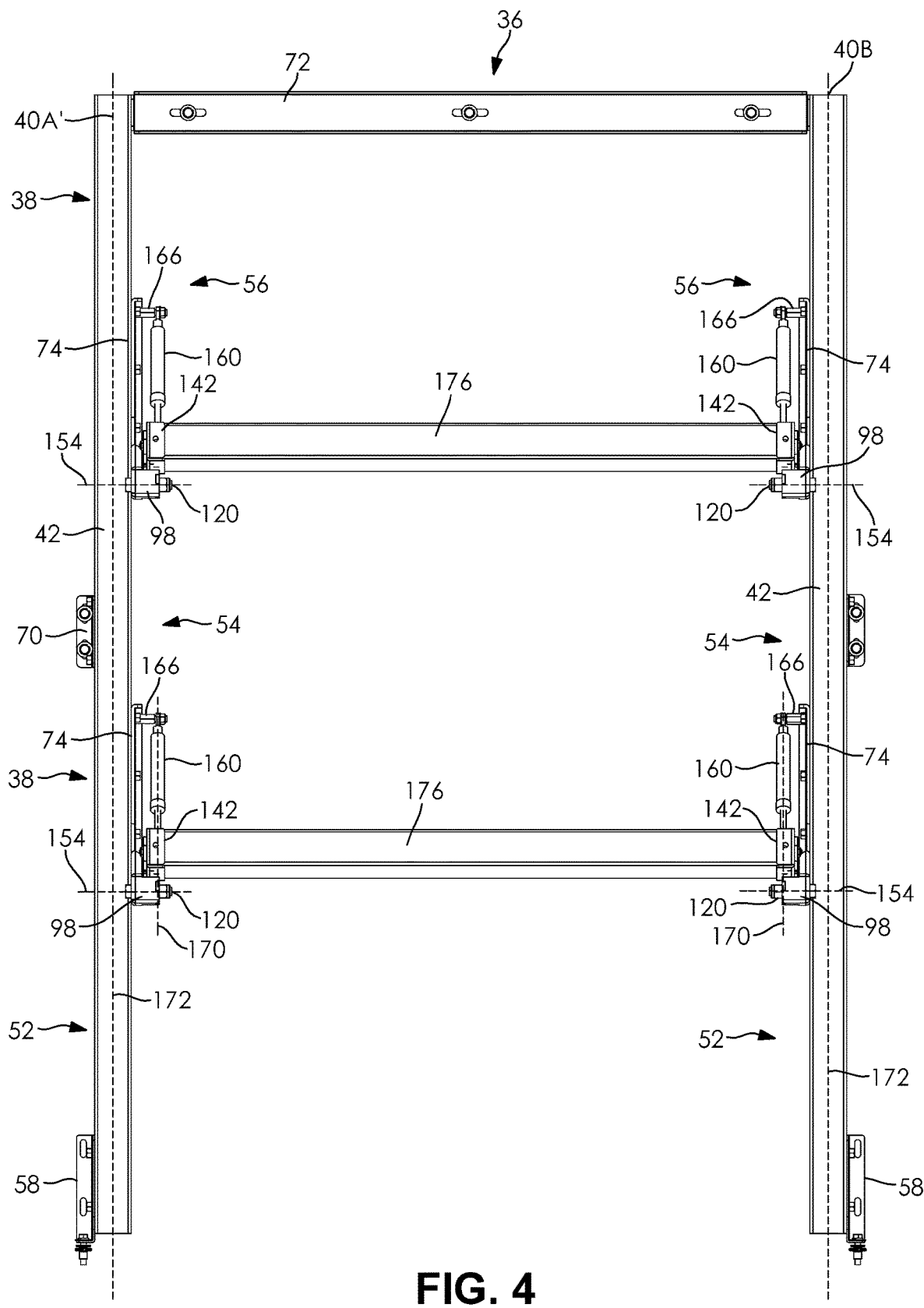
FIG. 4 depicts a front view of one embodiment of a shelf system with shelves in a lowered orientation.
Figure 5:
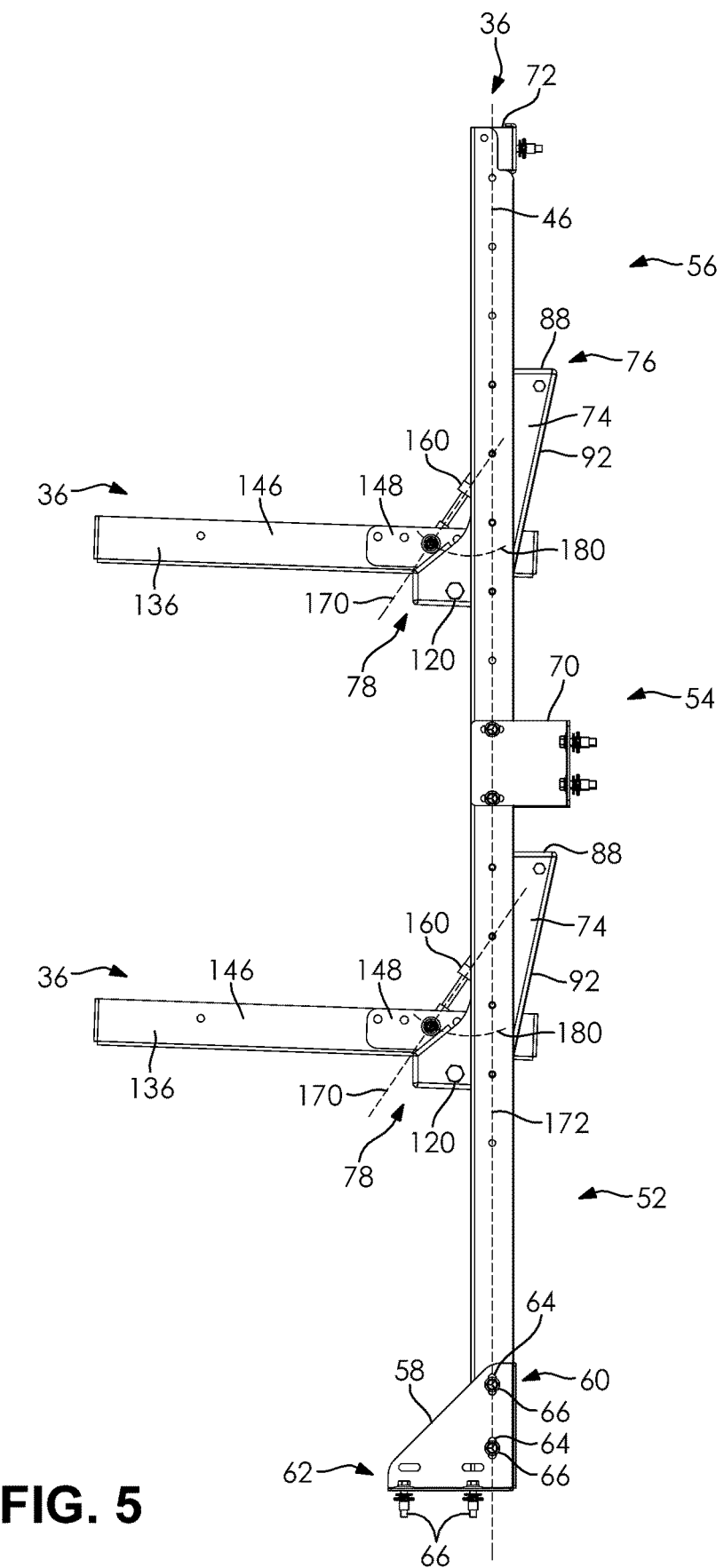
FIG. 5 depicts a side view of one embodiment of a shelf system with shelves in a lowered orientation.
Figure 6:
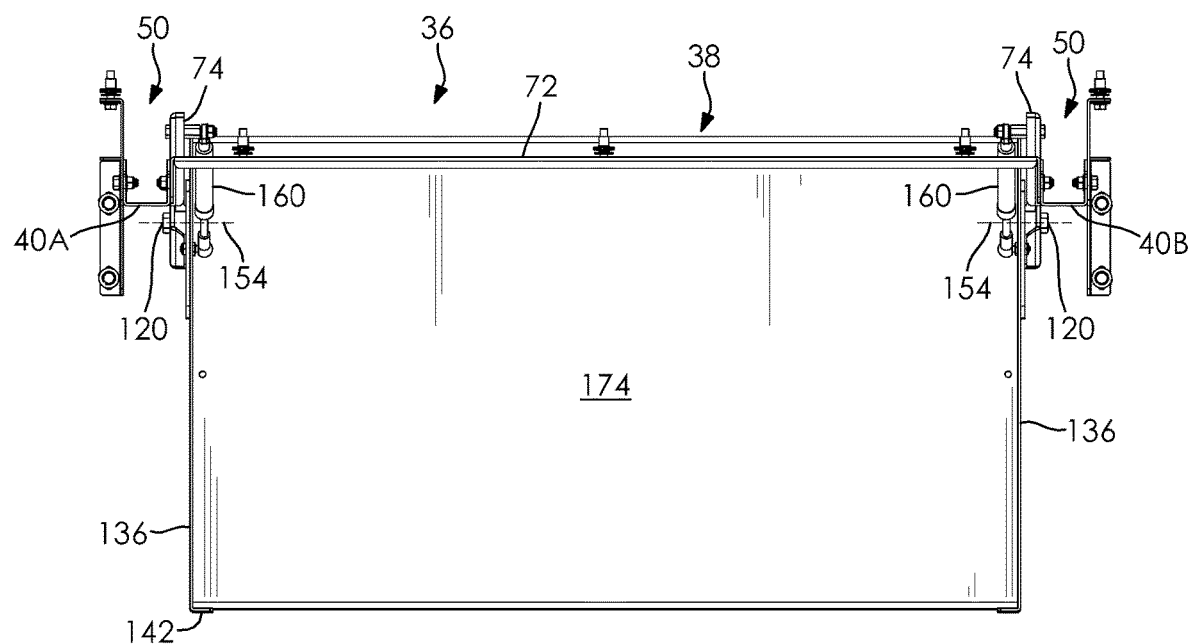
FIG. 6 depicts a top view of the shelf system of FIG. 5.
Figure 7:
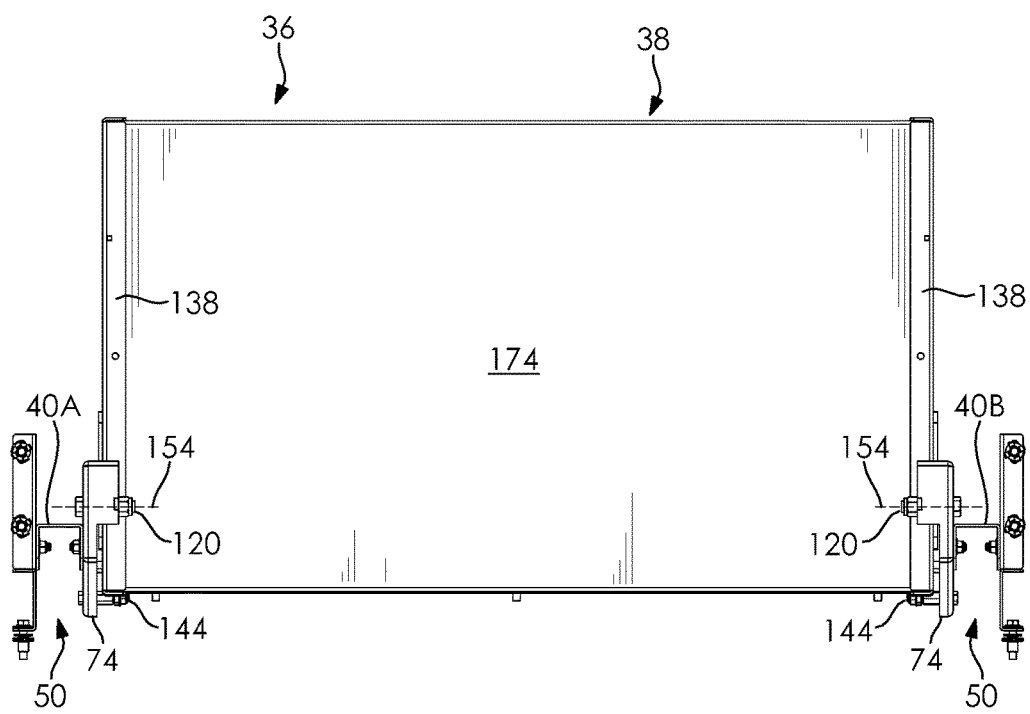
FIG. 7 depicts a bottom view of the shelf system of FIG. 5.
Figure 14:
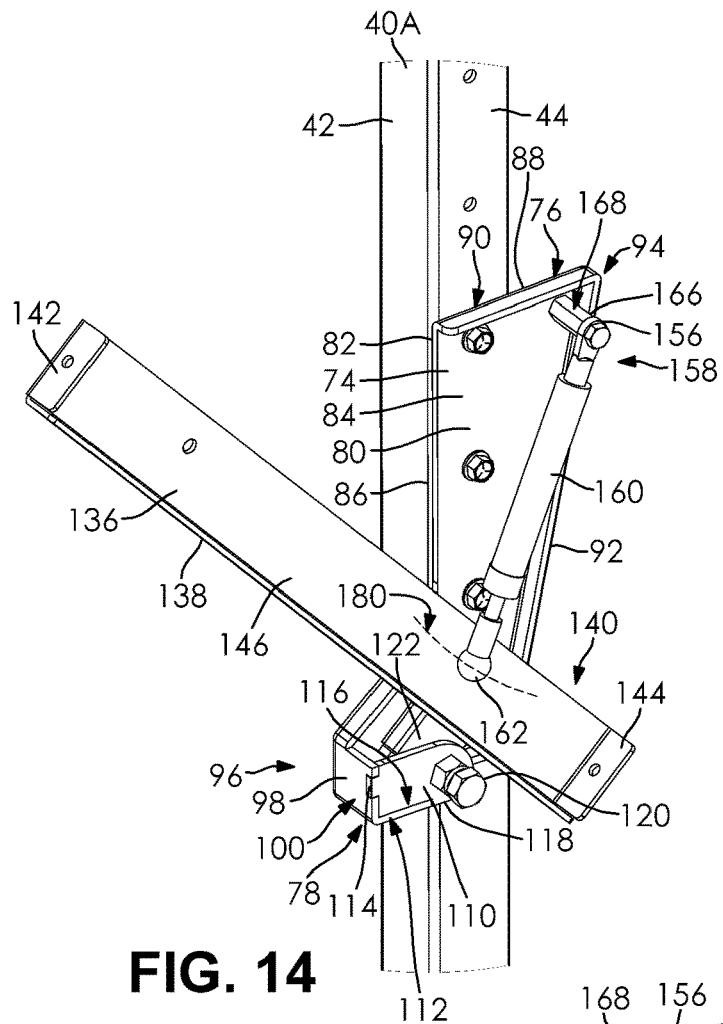
FIG. 14 depicts a cutaway view of the components in FIG. 12 in a different orientation.
Figure 15:
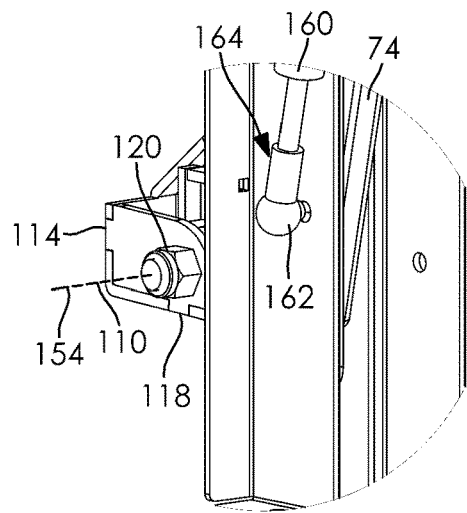
FIG. 15 depicts a detail from FIG. 12.
Figure 16:
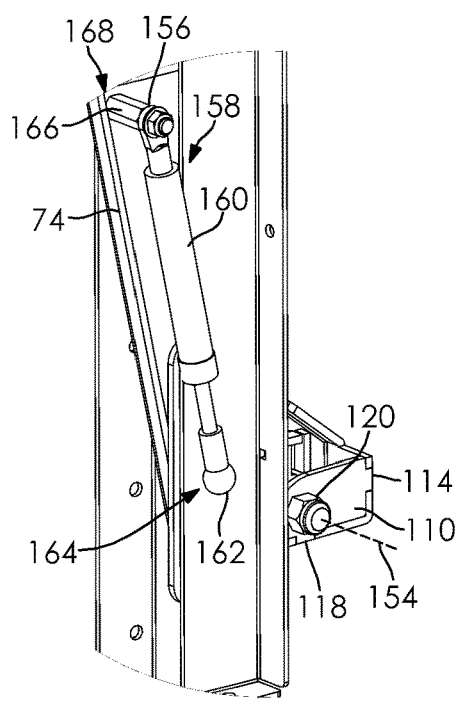
FIG. 16 depicts a rear perspective view of certain components of the shelf system.
Figure 17:
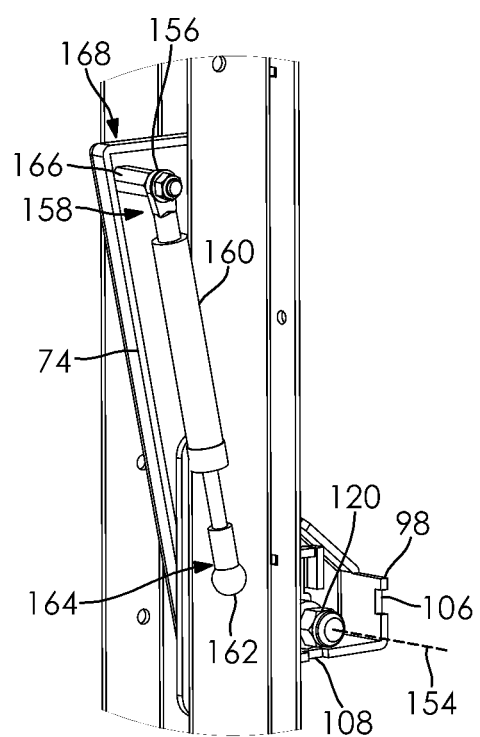
FIG. 17 depicts a rear perspective view of certain components of the shelf system.

As may be seen in FIGS. 4, 9, and 14, the biasing mounting bracket 74 may be attached to the inner side flange 44 of an upright member 40A, 40B, such as with mechanical fasteners 66. The mechanical fasteners 66 may be vertically aligned with one another adjacent a leading edge 86 of the biasing mounting bracket 74. The leading edge 86 may be aligned with the central flange 42 of an upright member 40A, 40B. In other words, the leading edge 86 may be coplanar with the central flange 42.

FIG. 14 also shows that the upper portion 76 of the biasing mounting bracket 74 may have an upper rib 88. The upper rib 88 may define an uppermost portion 90 of the biasing mounting bracket 74. The upper rib 88 may extend perpendicular to the first and second sides 82, 84 and it may extend away from the upright member 40A, 40B. The upper rib 88 extends along a portion of the upright member 40A, 40B, and behind the upright member 40A, 40B. More particularly, the upper rib 88, as well as the upper portion 76 of the biasing mounting bracket 74, may extend beyond the end of the side flanges 44, 46. In other words, the upper portion 76 of the biasing mounting bracket 74 may extend behind the backside 48 of the upright member 40A, 40B an end surface of the side flanges 40A, 40B.

The upper rib 88 may be connected to a rear rib 92, which may also be seen in FIG. 14. The rear rib 92 defines the rearmost portion 94 of the biasing mounting bracket 74. The rear rib 92 may extend perpendicular to the first and second sides 82, 84 of the biasing mounting bracket 74. The rear rib 92 may also extend at a non-parallel angle to the backside 48 or end surface of the side flanges 44, 46. The upper and rear ribs 88, 92 may add strength and robustness to the biasing mounting bracket 74.

A lower front portion 96 of the biasing mounting bracket 74 may extend forward of the central body flange 70 of the upright member 40A, 40B. In this embodiment, the first side 82 of the biasing mounting bracket 74 extends parallel with, and forward of, the inner side flange 44 of the upright member 40A, 40B. One embodiment of these features may be seen in FIG. 14.

Figure 12:
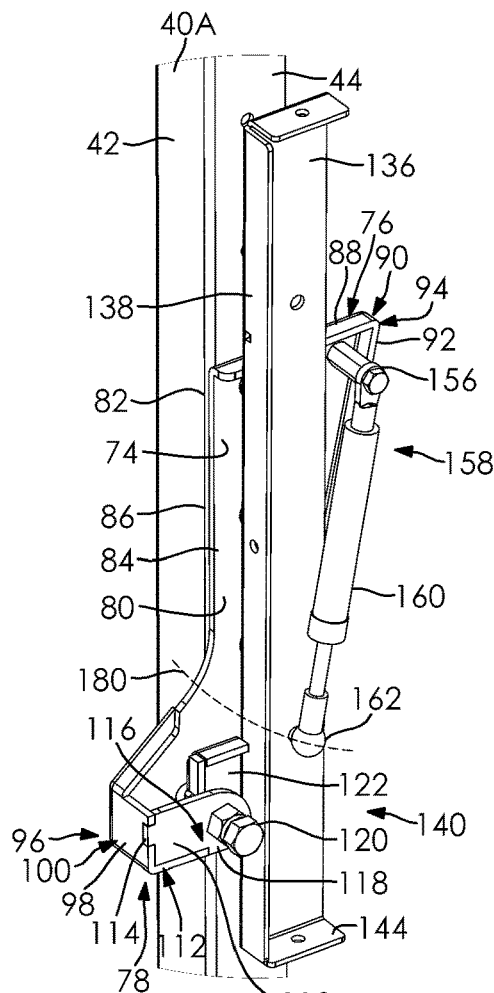
FIG. 12 depicts a cutaway view to show one embodiment of certain components of the shelf system.
Figure 13:
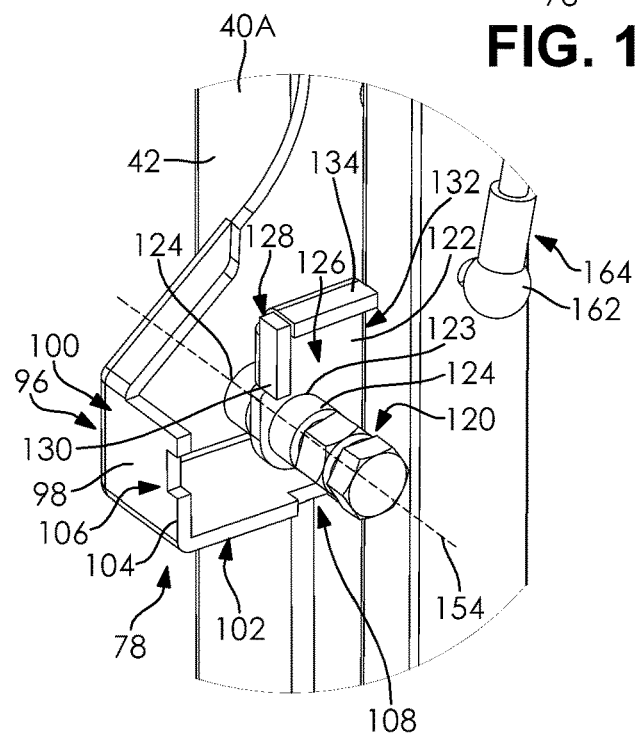
FIG. 13 depicts a detail from FIG. 12.

As shown in FIGS. 12-14, the first side 82 of the biasing mounting bracket 74 may transition to a stop flange 98. The stop flange 98 may be provided with a forward portion 100 and a bottom portion 102. The forward portion 100 may be parallel, but not coplanar with, the central flange 42 of the upright member 40A, 40B. The forward portion 100 may extend perpendicular to the first side 82 of the biasing mounting bracket 74. The forward portion 100 of the stop flange 98 may be the forward-most portion of the biasing mounting bracket 74. A side surface 104 of the stop flange 98 may have a first key slot 106 therein. The bottom portion 102 of the stop flange 98 may extend perpendicular to the forward portion 100. The bottom portion 102 may have a second key slot 108 therein.

A lock member 110 may connect with the stop flange 98. The lock member 110 may extend perpendicular to the forward portion 100 and the bottom portion 102 of the stop flange 98. A front portion 112 of the lock member 110 may have a first key 114 designed therein. The first key 114 has a complementary shape to the first key slot 106. A lower portion 116 of the lock member 110 may have a second key 118 designed therein. The second key 118 has a complementary shape to the second key slot 108. The keyed connection between the stop flange 98 and the lock member 110 prevents, or reduces, the likelihood that the lock member 110 will rotate with respect to the stop flange 98.

A pivot 120 may extend through the lock member 110 and the lower portion 78 of the biasing mounting bracket 74. The pivot 120 may be such as a bolt or fastener that extends through apertures in the lock member 110 and the biasing mounting bracket 74. The pivot 120 exits the biasing mounting bracket 74 on its first side 82 where it is positioned forward of the central flange 42 of the upright member 40A, 40B.

The pivot 120 may be supported by a pivot bracket 122. In one embodiment, the pivot 120 extends through an aperture 123 in the pivot bracket 122. Bushings 124 may be located on either side of the pivot bracket 122 to support relative motion of the pivot bracket 122 on the pivot 120.

The pivot bracket 122 may have a plate-like portion 126 in which the aperture 123 is located. The plate-like portion 126 may have a substantially constant thickness and extend substantially parallel the second side 84 of the biasing mounting bracket 74. A bottom portion 128 of the pivot bracket 122 may have a bottom rib 130 extending along its length. Similarly, a forward portion 132 of the pivot bracket 122 may have a forward rib 134 extending along its length. The ribs 130, 134 may add strength and robustness to the pivot bracket 122.

In one embodiment, the pivot bracket 122 is attached to a side bracket 136. The pivot bracket 122 may be connected to a lower rib 138 of the side bracket 136 and may extend perpendicular to the lower rib 138. The pivot bracket 122 may be connected adjacent a rear portion 140 of the side bracket 136.

The side bracket 136 may have a forward rib 142 and a rear rib 144. The forward, rear and lower ribs 142, 144, 138 all extend perpendicular to a body portion 144 of the side bracket 136. The body portion 146 of the side bracket 136 may be plate-like. The lower rib 138 may extend substantially the length of the body portion 146. The forward and rear ribs 142, 144 may extend parallel one another at opposite ends of the body portion 146.

Figure 11:
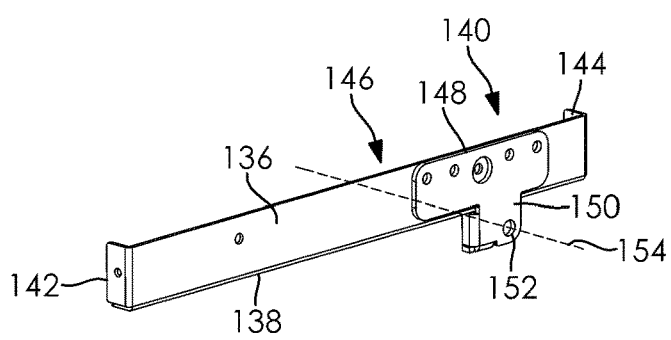
FIG. 11 depicts a side perspective view of one embodiment of a supplemental plate of the shelf system.

As shown in FIG. 11, a supplemental plate 148 may be attached to the side bracket 136. The supplemental plate 148 may be attached to the side bracket 136 with mechanical fasteners 66 and/or by welding. The supplemental plate 148 may have a height that matches the height of the body portion 146 of the side bracket 136. In some embodiments, however, the length of the supplemental plate 148 may be less than the length of the body portion 146 of the side bracket 136. Preferably, the supplemental plate 148 is located on a rear third of the side bracket 136.

The supplemental plate 148 may include a supplemental pivot bracket 150. The supplemental pivot bracket 150 may have the same or similar, size and shape to the pivot bracket 122. Further, the supplemental pivot bracket 150 may have a pivot aperture 152 that aligns with the pivot aperture 123 in the pivot bracket 122.

The supplemental pivot bracket aperture 152 and the pivot aperture 123 receive the pivot 120 therein to mount the side bracket 136 and the pivot bracket 122 on the pivot 120 to permit simultaneous relative up and down movement of the supplemental plate 148 and the side bracket 136.

The supplemental plate 148 adds robustness and strength to the side bracket 136 particularly at a location subject to connection loads, which can be appreciated from the following description.

The side bracket 136, and in particular, the lower rib 138 of the side bracket 136, is adapted to selectively rotate over a pivot axis 154 created by the pivot bracket 122, the biasing mounting bracket 74, the lock member 110 and the pivot 120.

A first biasing member mount 156 may be located on the body portion 146 of the side bracket 136. The mount 150 may be such as a ball stud. The ball stud may be located opposite the supplemental plate 148 on the side bracket 136.

A first end 158 of a biasing member 160 may be connected to the mount 156. The first end 158 of the biasing member 160 may have a ball stud housing 162 located thereon to receive the mount 156. The mount 156 and housing 162 permit rotational movement of the biasing member 160.

The mount 156 and the pivot aperture 123 in the pivot bracket 122 are not co-located in the depicted embodiment. Instead, the mount 156 and the pivot aperture 123 are offset from one another and separated from one another at least by the lower rib 138.

The biasing member 160 may be such as a fluid filled piston. The fluid may be such as gas or liquid. The biasing member 160 may also be a spring, or series or springs, or a piston driven by a spring.

A second end 164 of the biasing member 160 may be connected to the biasing mounting bracket 74. The connection may be direct, or in one embodiment, the second end 164 can be connected to a stop bar 166. The stop bar 166 may extend transverse the second side 84 of the biasing mounting bracket 74. As such, the stop bar 166 offsets the second end 164 of the biasing member 160 from the second side 84 of the biasing mounting bracket 74 by a fixed distance. The stop bar 166 may be located in an upper rear portion 168 of the biasing bracket 74. The stop bar 166, by being offset from the biasing mounting bracket 74, may also assist in keeping the biasing member 160 oriented in a single, substantially laterally fixed plane. In one embodiment, an axis 170 through the biasing member 160 is offset and not parallel with an axis of the upright member 40A, 40B.

A shelf plate 174 may be supported by the side bracket 136. In one embodiment, the shelf plate 174 may be substantially planar with a substantially constant thickness; the shelf plate 174 may also be unitary and one-piece. It is permissible, however for the shelf plate 174 to be comprised of more than one piece, and have different shapes and sizes other than as shown. One embodiment of the shelf plate 174 may be seen in FIGS. 1-3 and 6-10.

Forward and rear lips 176, 178 may be attached to the shelf plate 174. The lips 176, 178 may be angled with respect to the shelf plate 174, such as perpendicular with respect to the shelf plate 174. The lips 176, 178 help to retain items placed on the shelf plate 174 from rolling or falling off the edge of the shelf plate 174.

The shelf plate 174 may also have side lips, but in the depicted embodiment, these lips are provided by the side bracket 136. The side brackets 136 also help prevent items placed on the shelf plate 174 from rolling off the sides of the shelf plate 174.

The shelf plate 174 may be supported from below by the lower rib 138 of the side bracket 136. The side brackets 136 may also be connected to the shelf member 38, such as by locating mechanical fasteners 66 through the forward and rear ribs 142, 144 into the forward and rear lips 176, 178, respectively. Welding may also be used.

From the figures it can be appreciated that a side bracket 136, biasing member 160, biasing mounting bracket 76 and upright member 40A, 40B may be located on each side of the shelf plate 174. Thus, the two sides of the shelf plate 174 may be fitted with the same components. The various figures also illustrate that the shelf member 38 can selectively move from a deployed, or extended position, to a raised, or stowed position, and anywhere in between.

In the raised position, such as shown in FIG. 9, the mount 156, and thus the first end 158 of the biasing member 160, are located at a reference point x1, y1, z1 (based on an x, y, z plot). As the shelf member 38 is moved from the raised position to the deployed position, the mount 156 and the first end 158 of the biasing member 160 move along an arc 180, which can be appreciated from FIGS. 3 and 8. Thus, as the shelf member 38 is lowered, the mount 156 and the first end 158 of the biasing member 160 might be at location x1, y2 and z2, where the x position has not changed, but the y and z locations have. Further, when the shelf member 38 is in the deployed position, the mount 156 and the first end 158 of the biasing member 160 might be at a location x1, y3 and z3, where the x position has not changed but the y and z locations have continued to change. The second end 164 of the biasing member 160 may pivotally mounted on the stop bar 166 to accommodate the movement of the second end 164 of the biasing member 160. The pivot arc 180 may be located above the pivot axis 154.

As may be seen in FIG. 4, when the shelf member 38 is in the deployed position, the lower rib 138 of each side bracket 136 may be in direct, one-to-one contact with the stop flange 98 to prevent the shelf member 38 from extending below the stop flange 98. In this orientation, the shelf plate 174 may be in a substantially horizontal position.

As mentioned, the shelf member 38 may be located in a raised position as well. In this embodiment, such as shown in FIGS. 9 and 12, the body portion 146 of the side bracket 136 may be located in contact with the stop bar 166. The stop bar 166 prevents the shelf member 38 from rotating behind the upright member 40A, 40B.

In accordance with the provisions of the patent statutes, one embodiment of a device and method have been described in what is considered to represent its preferred embodiments. However, it should be noted that the device and method can be practiced otherwise than as specifically illustrated and described without departing from its spirit or scope.

What is claimed is:

1. A shelf system, comprising:
a shelf member;
a biasing mounting bracket attached to said shelf member having a rear portion and a forward portion; and
a biasing member having a first end connected to said rear portion of said biasing mounting bracket and a second end connected to said shelf member;
wherein said forward portion of said biasing mounting bracket has a lower stop adapted to prevent said shelf member from extending below a horizontal orientation, and
a pivot bracket located behind said lower stop through which a pivot extends and into said biasing mounting bracket to permit selective movement of said shelf member, wherein said pivot bracket is T-shaped.

2. The shelf system of claim 1, wherein said biasing mounting bracket is attached to at least one upright member and wherein said rear portion of said biasing mounting bracket extends behind said upright member and said forward portion of said biasing mounting bracket extends in front of said upright member.

3. The shelf system of claim 2, wherein said biasing mounting bracket has an upper front portion that is linear and coplanar with a front surface of said at least one upright member and said biasing mounting bracket has an angled, upper rear portion that extends behind a rear surface of said at least one upright member.

4. The shelf system of claim directly 3, wherein said biasing mounting bracket has a lower front portion that extends in front of said front surface of said at least one upright member and said biasing mounting bracket has a lower rear portion that is coplanar with a side surface of said at least one upright member.

5. The shelf system of claim 2, wherein a lower front portion of said biasing mounting bracket has a side portion that extends parallel a portion of said upright member, and a front portion that extends perpendicular to said side portion.

6. The shelf system of claim 5, wherein a lock member has at least one key adapted to be connected to said front portion, wherein said lock member extends parallel said side portion.

7. The shelf system of claim 1, wherein said first end of said biasing member is pivotally connected to a stop bar that extends perpendicularly from said biasing mounting bracket.

8. The shelf system of claim 1, wherein said second end of said biasing member is connected to a rear third portion of said shelf member with a ball stud.

9. The shelf system of claim 1, wherein an axis of said biasing member is offset and not parallel with an axis of said upright member.

10. The shelf system claim 1, wherein said second end of said biasing member is connected to said shelf member at a point rearward and above a pivot axis for said shelf member.

11. The shelf system of claim 1, wherein a first leg of said pivot bracket extends along a side bracket and a second leg of said pivot bracket extends transverse said side bracket, wherein said pivot extends through said second leg.

12. A shelf system, comprising:
at least one upright member having a biasing mounting bracket attached thereto, wherein said biasing mounting bracket has a forward portion that extends in front of said at least one upright member and a rear portion that extends behind said at least one upright member;
a shelf member with at least one side bracket;
a biasing member having a first end and a second end, wherein said first end is attached to said rear portion of said biasing mounting bracket and said second end is attached to said at least one side bracket;
wherein said at least one side bracket is adapted to selectively rotate over a pivot axis created by a pivot bracket under said at least one side bracket, said biasing member bracket and a lock member extending parallel said biasing member bracket.

13. The shelf system of claim 12, wherein said pivot axis is offset forward from said upright member.

14. The shelf system of claim 12, wherein said first end of said biasing member pivots in location and said second end of said biasing member defines a pivot arc between a shelf member raised position and a shelf member lowered position.

15. The shelf system of claim 14, wherein said pivot arc is located above said pivot axis.

16. The shelf system of claim 12, wherein said second end of said biasing member extends forward of said pivot axis in a shelf member lowered position.

17. The shelf system of claim 12, wherein said second end of said biasing member is aligned with said at least one upright member in a shelf member raised position.

18. The shelf system of claim 17, wherein a shelf plate of said shelf member is coplanar with a central flange of said upright member in a shelf member raised position.

19. The shelf system of claim 12, wherein said at least one side bracket has a forward portion and a rear portion with a body portion connecting the forward portion and the rear portion, wherein said pivot bracket extends below said body portion, and wherein a supplemental plate with a complementary shape to at least a portion of said body portion and said pivot bracket extends parallel said body portion and said pivot bracket.

* * * * *